United States Patent
Schacht et al.

(10) Patent No.: US 12,508,899 B2
(45) Date of Patent: Dec. 30, 2025

(54) POWERTRAIN SYSTEM WITH POWER TAKE-OFF (PTO) AND REDUCTION PLANETARY GEAR SET

(71) Applicant: Dana Belgium N.V., Flanders (BE)

(72) Inventors: Filip D. Schacht, Meulebeke (BE); Kurt Cattoor, Koolkerke (BE)

(73) Assignee: DANA BELGIUM, Bruges (BE)

( * ) Notice: Subject to any disclaimer, the term of this patent is extended or adjusted under 35 U.S.C. 154(b) by 0 days.

(21) Appl. No.: 18/450,669

(22) Filed: Aug. 16, 2023

(65) Prior Publication Data

US 2025/0058624 A1    Feb. 20, 2025

(51) Int. Cl.
*B60K 17/28*    (2006.01)
*B60K 1/02*    (2006.01)
*B60K 17/08*    (2006.01)

(52) U.S. Cl.
CPC ............. *B60K 17/28* (2013.01); *B60K 1/02* (2013.01); *B60K 17/08* (2013.01)

(58) Field of Classification Search
CPC .......... B60K 17/28; B60K 1/02; B60K 17/08
See application file for complete search history.

(56) References Cited

U.S. PATENT DOCUMENTS

| | | | | |
|---|---|---|---|---|
| 3,762,487 A * | 10/1973 | Bilas | B62D 61/125 180/24.09 |
| 3,918,546 A * | 11/1975 | Chichester | F16H 61/4078 180/243 |
| 4,335,429 A * | 6/1982 | Kawakatsu | B60T 1/10 180/65.23 |
| 4,523,495 A * | 6/1985 | Sala | B60K 17/346 475/221 |
| 4,604,908 A * | 8/1986 | Dolan | F16H 3/54 74/15.88 |
| 5,390,117 A * | 2/1995 | Graf | F16H 61/0213 706/900 |
| 6,533,693 B2 * | 3/2003 | Bowen | B60K 6/365 903/910 |
| 6,752,233 B1 * | 6/2004 | Shakespear | B60K 17/35 475/198 |
| 7,311,627 B2 | 12/2007 | Tarasinski | |
| 9,187,087 B2 * | 11/2015 | Martin | B60W 20/10 |
| 2003/0125153 A1 * | 7/2003 | Kukucka | B60K 17/3505 475/198 |
| 2005/0137042 A1 * | 6/2005 | Schmidt | B60W 20/40 475/5 |
| 2007/0214906 A1 * | 9/2007 | Fahland | F16H 59/38 74/331 |
| 2011/0042155 A1 | 2/2011 | Tarasinski et al. | |
| 2015/0105200 A1 * | 4/2015 | Duhaime | F16H 3/725 475/5 |

(Continued)

FOREIGN PATENT DOCUMENTS

WO    2022109644 A1    6/2022

*Primary Examiner* — Alentin Neacsu
(74) *Attorney, Agent, or Firm* — McCoy Russell LLP (57) ABSTRACT

Methods and systems for a powertrain system. The powertrain system includes a first traction motor and a reduction planetary gear set rotationally coupled to the first traction motor. The powertrain system further includes a power take-off (PTO) that is configured to attach to an implement, and an input shaft rotationally coupled to the first traction motor and a transmission, where the reduction planetary gear set has a grounded component.

15 Claims, 9 Drawing Sheets

(56) References Cited

U.S. PATENT DOCUMENTS

2018/0031085 A1* 2/2018 Steinberger ............ B60K 6/365
2018/0306294 A1* 10/2018 Wang ...................... F16H 48/36
2022/0134856 A1* 5/2022 Andringa ................ B60L 3/102
                  74/15.4

* cited by examiner

| Transmission Mode | Traction Motor Transmission Input + PTO | PTO |
|---|---|---|
| Clutch (114) | Engaged | Disengaged |

| Transmission Mode | Dual Motor Transmission Input + PTO | PTO | Motor (502) Transmission Input | Motor (550) Transmission Input |
|---|---|---|---|---|
| Clutch (518) | Engaged | Disengaged | Engaged | Disengaged |
| Clutch (564) | Engaged | Engaged | Disengaged | Disengaged |

POWERTRAIN SYSTEM WITH POWER TAKE-OFF (PTO) AND REDUCTION PLANETARY GEAR SET

TECHNICAL FIELD

The present disclosure relates to a powertrain system, and more specifically to a powertrain system including a power take-off (PTO) and a reduction planetary gear set.

BACKGROUND AND SUMMARY

Electric powertrains have been deployed in certain vehicles due to their reduced complexity and increased compactness. Further, some vehicles, such as off-highway and other types of vehicles, have been equipped with power take-offs (PTOs) that are used to power implements. Traction motors of electric powertrains deliver comparatively high input speeds to transmissions when compared to transmissions that directly receive mechanical power from internal combustion engines. However, the high input speed that is delivered to the transmission may be higher than desired for the input of some PTOs.

Attempts have been made to use a dedicated electric motor which is separate from a traction motor, to deliver mechanical power to a PTO. However, using a separate motor to power a PTO, increases the size and complexity of the electric powertrain. Other attempts have been made to incorporate a PTO into a hybrid powertrain. For instance, WO 2022/109644 A1 to Wiener et al. discloses a hybrid transmission which includes an internal combustion engine, electric motors, and a planetary gear set that is rotationally coupled to one of the electric motors and the engine. The planetary gear set allows the Wiener's transmission to achieve continuous variability in each gear range. Wiener's transmission additionally includes a PTO that receives mechanical power from a ring gear of the planetary gear set.

The inventors have recognized several drawbacks with Wiener's hybrid powertrain and other powertrains that include PTOs incorporated therein. Further, when Wiener's PTO receives rotational input from only the electric motor, the speed of the input may be undesirable for certain implements. More generally, Wiener's PTO architecture may not be applicable to an all-electric powertrain. Powertrains that include dedicated motors and inverters for powering PTOs are complex and may present manufacturing and packaging difficulties, in some cases.

The inventors have recognized the aforementioned issues and developed a powertrain system. In one example, the powertrain system includes a first traction motor, a reduction planetary gear set rotationally coupled to the traction motor, and a power take-off (PTO) that is configured to attach to an implement. Further, the powertrain system includes an input shaft rotationally coupled to the first traction motor and a transmission. The reduction planetary gear set includes a grounded component. For instance, the planetary gear set may have a grounded ring gear. The planetary gear set therefore allows the motor's high rotational output speed to be brought into a useable range for a wider variety of PTOs. In this way, the system's capabilities are expanded in a space efficient manner.

Further, in one example, to achieve a desired speed reduction, the reduction planetary gear set may include a sun gear that is fixedly coupled to the input shaft, a carrier that is rotationally coupled to the PTO, and a ring gear that is grounded. In this way, a desirable gear ratio that is usable by a wide range PTOs is achieved, further expanding the system's capabilities.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A powertrain system including a reduction planetary gear set that delivers mechanical power to a power take-off (PTO) from a traction motor in a desirable speed range, thereby allowing the PTO to power implements within a desired speed range.

Figure 1:
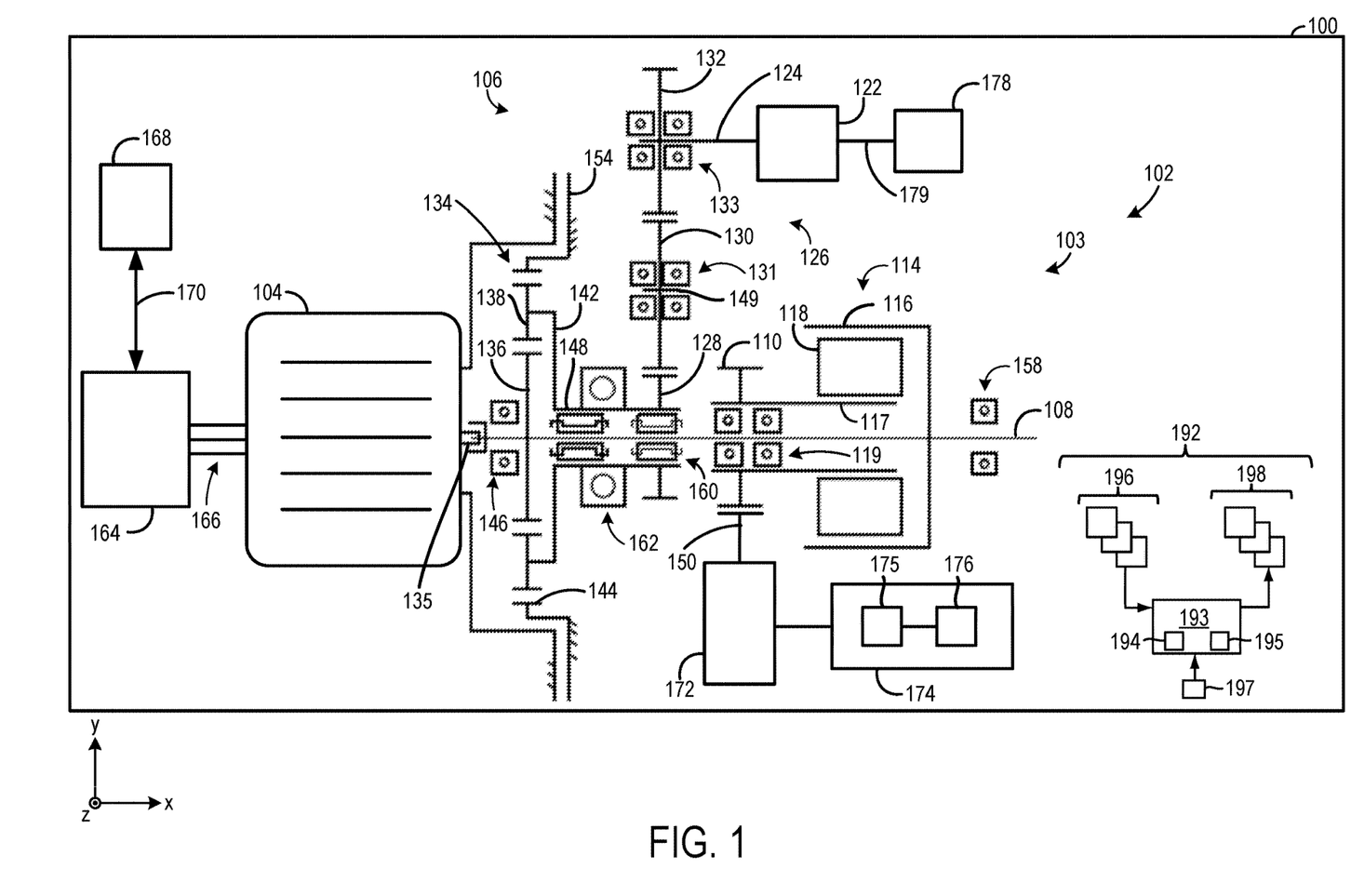
FIG. 1 shows a portion an electric powertrain with one traction motor and a power take-off (PTO) in a vehicle.

FIG. 1 depicts a vehicle 100 with an electric powertrain 102 with a system 103 (e.g., a powertrain system). As such, the vehicle 100 is an electric vehicle (EV) such as an all-electric vehicle (e.g., a battery electric vehicle (BEV)). All-electric vehicles may specifically be used due to their reduced complexity and therefore reduced points of potential component degradation. However, the vehicle may be a hybrid electric vehicle (HEV) where the vehicle includes an internal combustion engine (ICE), in other examples.

The electric powertrain 102 includes a traction motor 104 which is rotationally coupled to a transmission 172 (e.g., an electric transmission), among other components. The traction motor 104 may include components such as a rotor and a stator that electromagnetically interact during operation to generate motive power. Furthermore, the traction motor may be a motor-generator that also generates electrical energy during regeneration operation.

Further, the traction motor 104 may be a multi-phase traction motor that is supplied with electrical energy via an inverter 164. The inverter 164 is configured to convert direct current (DC) to alternating current (AC) and vice versa. As such, the traction motor 104 may be an AC traction motor. For instance, the traction motor and the inverter may be three-phase devices, in one use-case example. However, motors and inverters configured to operate using more than three phases have been contemplated. The electrical connection between the inverter 164 and the traction motor 104 is indicated via electrical lines 166 (e.g., multi-phase wires). However, other suitable electrical connections may be established between the motor and the inverter.

The inverter 164 may receive DC power from at least one electrical energy source 168 (e.g., an energy storage device such a traction battery, a capacitor, combinations thereof, and the like and/or an alternator). Arrows 170 indicate the flow of electrical energy between the electrical energy source 168 and the inverter 164.

The electric powertrain 102 further includes a PTO assembly 106. The PTO assembly 106 includes a PTO 122 (e.g., a hydraulic PTO unit such as a hydraulic pump) and may include a PTO gear set 126. The PTO may specifically be a hydraulic pump that is configured to deliver hydraulic fluid to implements that perform functions of the vehicle such as lifting, pushing, and the like.

The PTO gear set 126 may include a gear 130 and a gear 132 coupled to a PTO input shaft 124 such that the gear 132 and the PTO input shaft 124 co-rotate. The number of gears in the PTO gear set may be selected based on the size of the PTO. For instance, the number of gears in the PTO gear set may be increased when a larger PTO is used in the system.

One or more PTO implements 178 may be coupled to the PTO 122, as denoted via a hydraulic connection 179. The one or more PTO implements 178 may be hydraulically driven devices. The PTO gear set 126 is mechanically coupled to the traction motor 104 via a reduction planetary gear set 134. In this way, mechanical power is delivered to the PTO 122 in a desirable speed range, thereby increasing the system's applicability and customer appeal.

The reduction planetary gear set 134 includes a sun gear 136, planet gears 138, a ring gear 144, and a carrier 142 for the planet gears. As such, the planetary gear set may be a simple planetary gear set thereby increasing PTO assembly compactness. However, other types of planetary gear sets such as multi-stage planetary gear sets have been contemplated.

In the illustrated example, the sun gear 136 of the reduction planetary gear set 134 is fixedly coupled to an input shaft 108 for the transmission. The input shaft 108 may be directly coupled to the traction motor's rotor shaft 135.

In the reduction planetary gear set 134, the planet gears 138 mesh with the sun gear 136 and the ring gear 144. The carrier 142 is rotationally coupled to a gear 128. As such, the sun gear 136 functions as the input of the planetary gear set 134 and the carrier 142 functions as the output of the reduction planetary gear set in the illustrated example. In this way, the planetary gear set may achieve a desired gear ratio. Further, the ring gear 144 is grounded. To elaborate, the ring gear 144 may be grounded by a transmission housing 154. In this way, the housing serves a dual-functionality, which enables the space efficiency of the transmission to be increased, if desired.

Rotation of the planet gears 138 drives rotation of the carrier 142. The carrier 142 is rotationally coupled to a gear 128 via a shaft 148. The shaft 148 has a central opening through which the input shaft 108. Further, bearings 160 (e.g., needle bearings or other suitable types of bearings) may be coupled to the shaft 148 and the input shaft 108 to allow these shafts to independently rotate. Another bearing 162 may be coupled to the shaft 148. A bearing as described herein may include inner races, outer races, and roller elements (e.g., balls, cylindrical rollers, tapered cylindrical rollers, and the like).

Further, the gear 130 of the PTO gear set 126 meshes with the gear 128, in the illustrated example. Additionally, in the illustrated example, the gear 128 is fixedly coupled to or formed with the shaft 148 such that they co-rotate and the gear 130 is fixedly coupled to an idler shaft 149. Bearings 131 may be coupled to the idler shaft 149 and permit rotation thereof. Additionally, the gear 130 meshes with the gear 132, in the illustrated example. The gear 132 is fixedly coupled to or formed with the PTO input shaft 124. Bearings 133 are coupled to the PTO input shaft 124, in the illustrated example. The PTO input shaft 124 provides rotational input to the PTO 122.

When the traction motor 104 is generating rotational output, mechanical power is transferred from the input shaft 108, through the reduction planetary gear set 134 to the gear 128, from the gear 128 to the PTO gear set 126, and from the PTO gear set 126 to the PTO 122. The PTO 122 driven via the traction motor 104 in turn powers the one or more PTO implements 178. Further, the ratio of the gears 130, 132 may be selected to provide rotational input to the PTO 122 within a desired torque/speed range. Although, the PTO gear set 126 includes two gears in the illustrated example, the PTO gear set may include an alternate number of gears, in other examples, as previously indicated.

In the illustrated example, the gear 128 may include an opening through which the input shaft 108 extends. A bearing 146 and a bearing 158 may be coupled to (e.g., coupled to opposing ends) the input shaft 108 to permit rotation thereof and support the shaft.

The reduction planetary gear set 134 may specifically be positioned adjacent (e.g., directly adjacent) the traction motor 104 to increase the space efficiency of the electric powertrain 102, if desired. Additionally, the reduction planetary gear set 134 may be a simple reduction planetary gear set that solely includes the sun gear 136, the ring gear 144, the planet gears 138, and the carrier 142. By using a simple planetary gear set, transmission compactness is increased and friction losses when compared to more complex planetary gear sets such as multi-stage planetary gear sets, Ravigneaux planetary gear sets, and the like. Consequently, the electric powertrain 102 may pose less space constraints on other vehicle components, thereby permitting the system's applicability to be expanded. Further, losses in the electric powertrain 102 are decreased when a simple reduction planetary gear set is used as opposed to more complex planetary gear sets, such as multi-stage planetary gear sets. However, in alternate examples, a multi-stage planetary gear set may be used in the transmission which will however decrease the system's compactness and increases losses.

The system 103 may include a transmission disconnect clutch 114 which is configured to selectively decouple the input shaft 108 from the transmission 172. To elaborate, the transmission disconnect clutch 114 may be positioned coaxial to the input shaft 108 and may be configured to selectively rotationally couple a gear 110 (e.g., a clutch gear) to the input shaft 108. The transmission disconnect clutch 114 may specifically be a friction clutch, in one example. However, other types of clutches have been contemplated such as a synchronizer or a dog clutch, in different examples. Further, in an alternate example, the transmission disconnect clutch may be omitted from the electric powertrain. In such an example, the packaging efficiency of the electric powertrain may be increased at the expense of reduced functionality.

In the friction clutch example, the transmission disconnect clutch 114 may include a drum 116 that is rotationally coupled to the input shaft 108 and a hub 117 that is rotationally coupled to the gear 110. The drum 116 and the hub 117 each carry sets of plates 118 (e.g., friction and separator plates). The hub 117 is rotationally coupled to the gear 110. Bearings 119 may be coupled to the hub 117 and the input shaft 108 such that they independently rotate when the disconnect clutch is disengaged. Thus, when the transmission disconnect clutch 114 is engaged (i.e., closed), the gear 110 is coupled to the input shaft 108 such that they co-rotate. In this way, when the transmission disconnect clutch 114 is engaged mechanical power is transferred from the input shaft 108 to the gear 110. Conversely, when the transmission disconnect clutch 114 is disengaged (i.e., open), power transfer between the input shaft 108 and the gear 110 is inhibited.

A friction clutch, as described herein, may include two sets of plates designed to frictionally engage and disengage one another while the clutch is opened and closed, respectively. As such, the amount of torque transferred through the clutch may be modulated depending on the degree of friction plate engagement. Thus, the friction clutches described herein may be operated with varying amounts of engagement (e.g., continuously adjusted through the clutch's range of engagement). Further, the friction clutches described herein may be wet friction clutches through which lubricant is routed to increase clutch longevity. However, dry friction clutches may be used in alternate examples. The transmission disconnect clutch 114 and other friction clutches described herein may be adjusted via hydraulic, pneumatic, and/or electro-mechanical actuators. For instance, hydraulically operated pistons may be used to induce clutch engagement of the friction clutches. However, solenoids may be used for electro-mechanical clutch actuation, in other examples.

The gear 110 may be rotationally coupled to the transmission 172 via mechanical component(s) 150 (e.g., gear(s), shaft(s), chain(s), joint(s), combinations thereof, and the like). In turn, the transmission 172 may be mechanically coupled to one or more drive axle assemblies 174 that each include a differential 175 which is in turn rotationally coupled to drive wheels 176.

The vehicle 100 further includes a control system 192 with a controller 193 as shown in FIG. 1. The controller 193 may include a microcomputer with components such as a processor 194 (e.g., a microprocessor unit), input/output ports, an electronic storage medium 195 for executable programs and calibration values (e.g., a read-only memory chip, random access memory, keep alive memory, a data bus, and the like). The storage medium may be programmed with computer readable data representing instructions executable by the processor for performing the methods and control techniques described herein as well as other variants that are anticipated but not specifically listed.

The controller 193 may receive various signals from sensors 196 coupled to various regions of the vehicle 100 and specifically the electric powertrain 102. For example, the sensors 196 may include a pedal position sensor designed to detect a depression of an operator-actuated pedal such as an accelerator pedal and/or a brake pedal, a speed sensor at the transmission input shaft, energy storage device state of charge (SOC) sensor, clutch position sensors, etc. Motor speed may be ascertained from the amount of electrical power sent from the inverter to the traction motor. An input device 197 (e.g., accelerator pedal, brake pedal, drive mode selector, combinations thereof, and the like) may further provide input signals indicative of an operator's intent for vehicle control. For instance, buttons, switches, a touch interface, combinations thereof, and the like may be included in the vehicle to enable the operator to engage and disengage the transmission 172 from the traction motor 104. However, in other examples, automated control strategies may be used to connect and disconnect the transmission 172.

Upon receiving the signals from the sensors 196 of FIG. 1, the controller 193 processes the received signals, and employs various actuators 198 of vehicle components to adjust the components based on the received signals and instructions stored on the memory of controller 193. For example, the controller 193 may receive an accelerator pedal signal indicative of an operator's request for increased vehicle acceleration. In response, the controller 193 may command operation of the inverters to adjust traction motor power output and increase the power delivered from the traction motors to the transmission 172 and/or the PTO 122. The controller 193 may, during certain operating conditions, be designed to send commands to the transmission disconnect clutch 114 to engage or disengage the clutch. For instance, a control command may be sent to the transmission disconnect clutch 114 and in response to receiving the command, an actuator in the clutch may adjust the clutch based on the command for clutch engagement or disengagement. The other controllable components in the vehicle, system, etc. may function in a similar manner with regard to sensor signals, control commands, and actuator adjustment, for example. Further, a similar control system may be included in the other electric powertrain embodiments described herein.

In some examples, the transmission 172 may be a multi-speed transmission. For instance, the transmission 172 may be configured as a two-speed, a three-speed, a four-speed, etc. transmission in different examples. However, in another example, the transmission may be configured as a single speed transmission. Mechanical power paths through the transmission 172 of the vehicle 100 are discussed in detail herein with regard to FIGS. 2 and 3.

An axis system is provided in FIG. 1, as well as FIGS. 2-7, for reference. The y-axis may be a vertical axis (e.g., parallel to a gravitational axis), the x-axis may be a lateral axis (e.g., horizontal axis), and/or the z-axis may be a longitudinal axis. However, alternate orientations of the axes may be used, in other examples.

Figure 2:
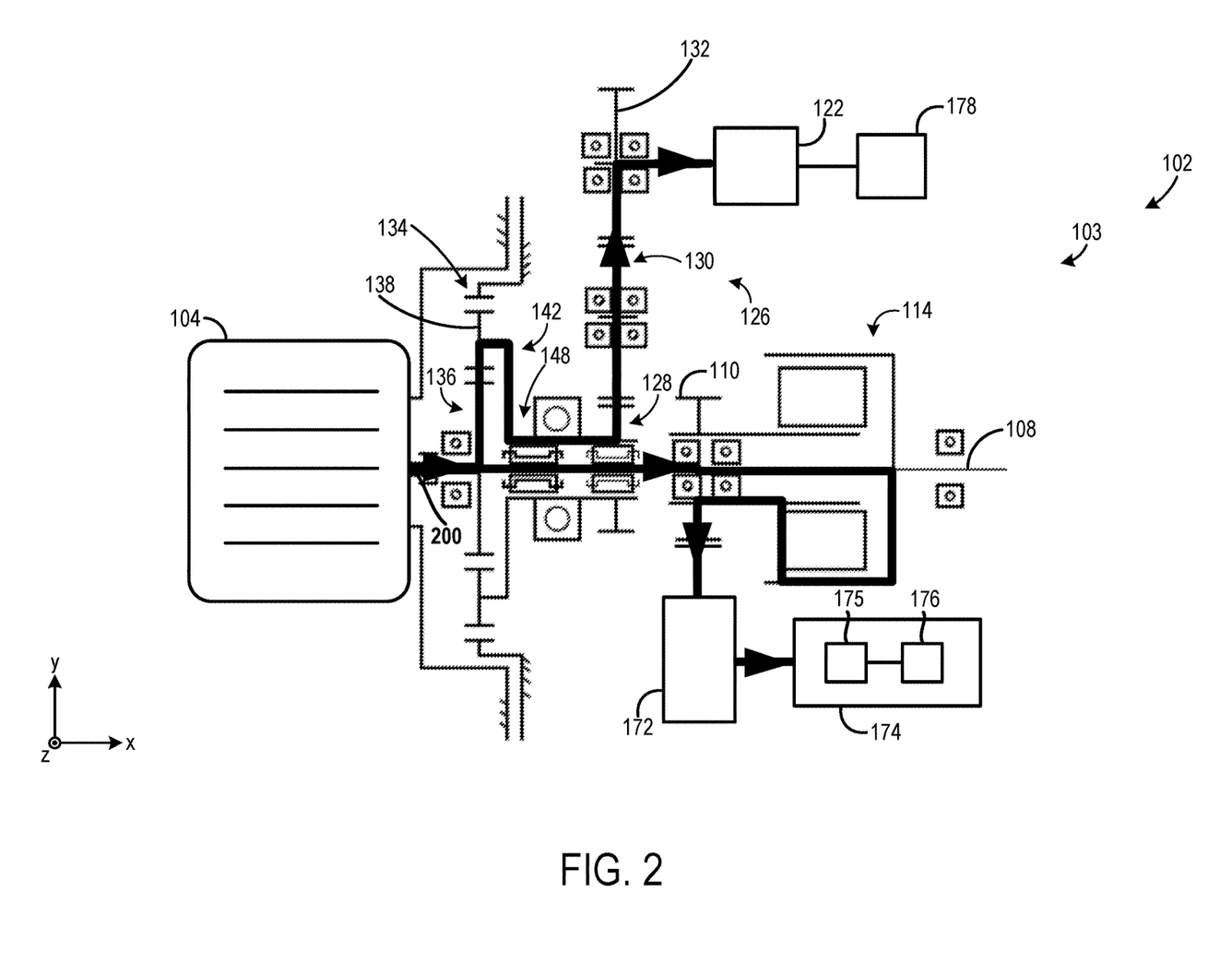
FIGS. 2 and 3 show mechanical power paths through the electric powertrain of FIG. 1.
Figure 3:
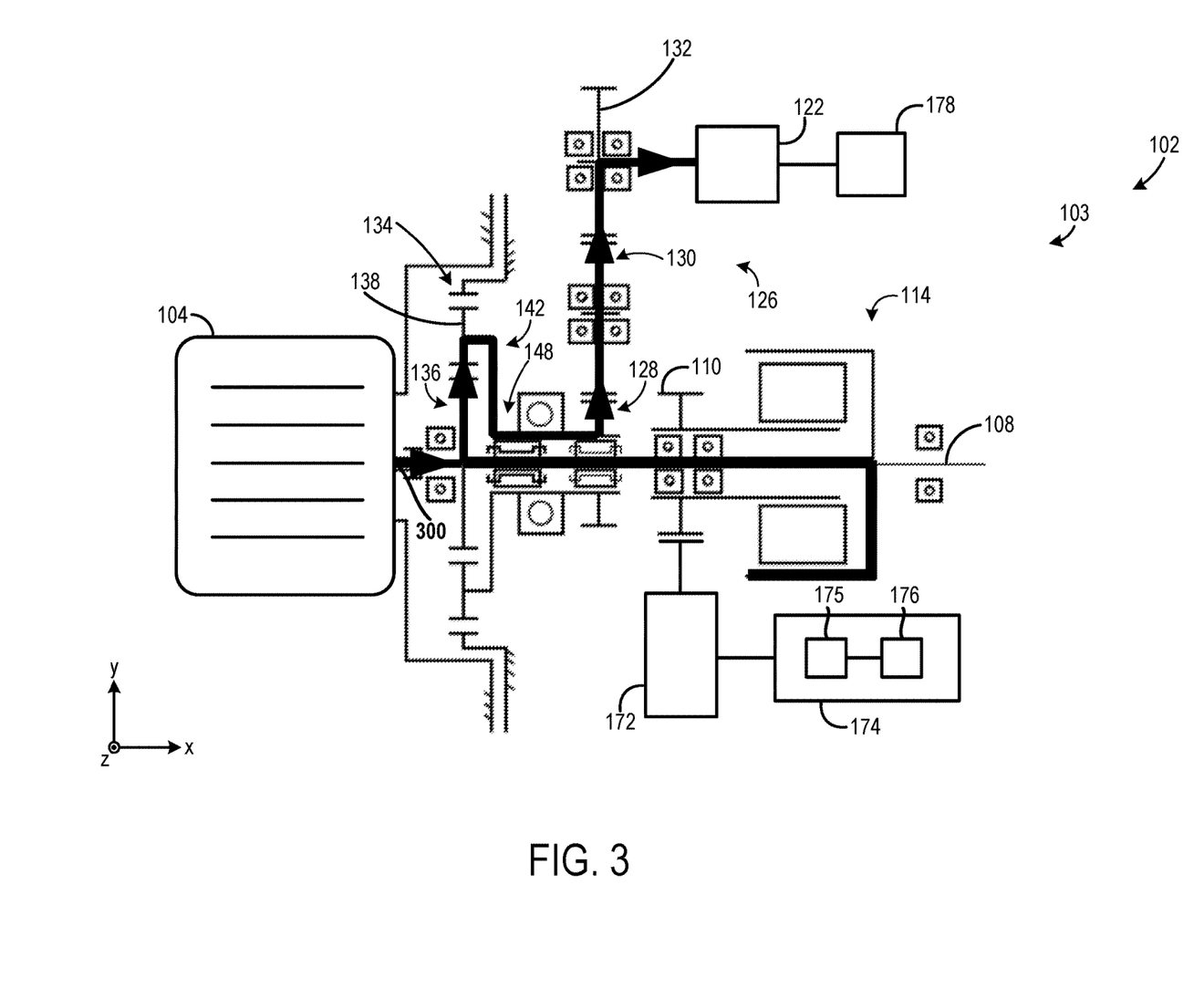

FIGS. 2 and 3 depict different mechanical power paths through the system 103 of the electric powertrain 102 in two different operating modes. In the operating mode depicted in FIG. 2, mechanical power is provided to the PTO 122 and to the transmission 172, where power may then be distributed to the one or more drive axle assemblies 174. In the operating mode depicted in FIG. 3, mechanical power is provided to the PTO 122 but not to the transmission 172. The components in the electric powertrain 102 that are shown in FIGS. 2 and 3 that have been previously described with regard to FIG. 1 are similarly numbered, and redundant description is omitted for brevity. It will be understood that the clutch 114 may be engaged or disengaged to permit and inhibit power flow from the motor to the transmission.

As shown in FIG. 2, the transmission disconnect clutch 114 is engaged and therefore permits power to be transferred from the input shaft 108 to the transmission 172 via the gear 110 (e.g., the clutch gear). Thus, FIG. 2 shows a mechanical power path 200 (denoted via bold arrows) that includes a first branch which provides power to the PTO 122 and a second branch which provides power to the transmission 172.

The first branch of the mechanical power path 200 unfolds as follows: mechanical power moves from the traction motor 104 to the sun gear 136, from the sun gear 136 to the planet gears 138, from the planet gears 138 to the carrier 142, from the carrier 142 to the shaft 148, from the shaft 148 to the gear 128, from the gear 128 to the gear 130, from the gear 130 to the gear 132, and from the gear 132 to the PTO 122. In turn, the PTO 122 may deliver power (e.g., mechanically or hydraulically) to the one or more PTO implements 178.

The second branch of the mechanical power path 200 unfolds as follows: mechanical power moves from the traction motor 104 to the transmission disconnect clutch 114, from the transmission disconnect clutch to the gear 110, from the gear 110 to the transmission 172, from the transmission 172 to the one or more axle assemblies 174.

In FIG. 3, the transmission disconnect clutch 114 is disengaged and therefore prevents power from being transferred from the input shaft 108 to the transmission 172 via the gear 110. The mechanical power path 300 (denoted via bold arrows) unfolds as follows: mechanical power moves from the traction motor 104 to the sun gear 136, from the sun gear 136 to the planet gears 138, from the planet gears 138 to the carrier 142, from the carrier 142 to the shaft 148, from the shaft 148 to the gear 128, from the gear 128 to the gear 130, from the gear 130 to the gear 132, and from the gear 132 to the PTO 122.

Figure 4:
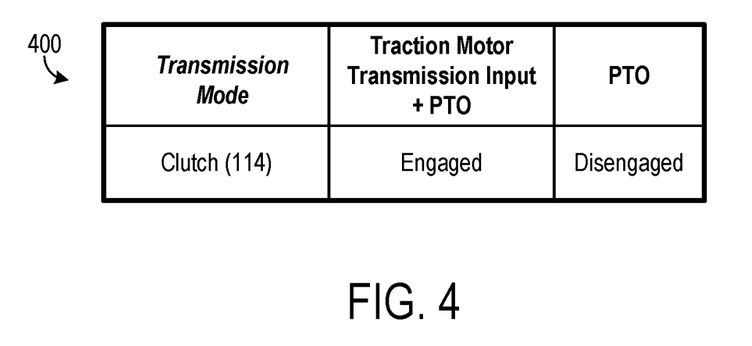
FIG. 4 shows a chart that correlates the different electric powertrain operating modes to clutch positions in the electric powertrain, depicted in FIG. 1.

FIG. 4 shows a chart 400 that correlates the configurations of the transmission disconnect clutch 114 in the two operating modes of the electric powertrain, shown in FIGS. 2 and 3. As shown, in the mode where mechanical power is provided to both the PTO and the transmission (whose power path is illustrated in FIG. 2), the transmission disconnect clutch is engaged. Conversely, in the mode where mechanical power is provided to solely the PTO (whose power path is illustrated in FIG. 3), the transmission disconnect clutch is disengaged and mechanical power is solely provided to the PTO from the traction motor.

Figure 5:
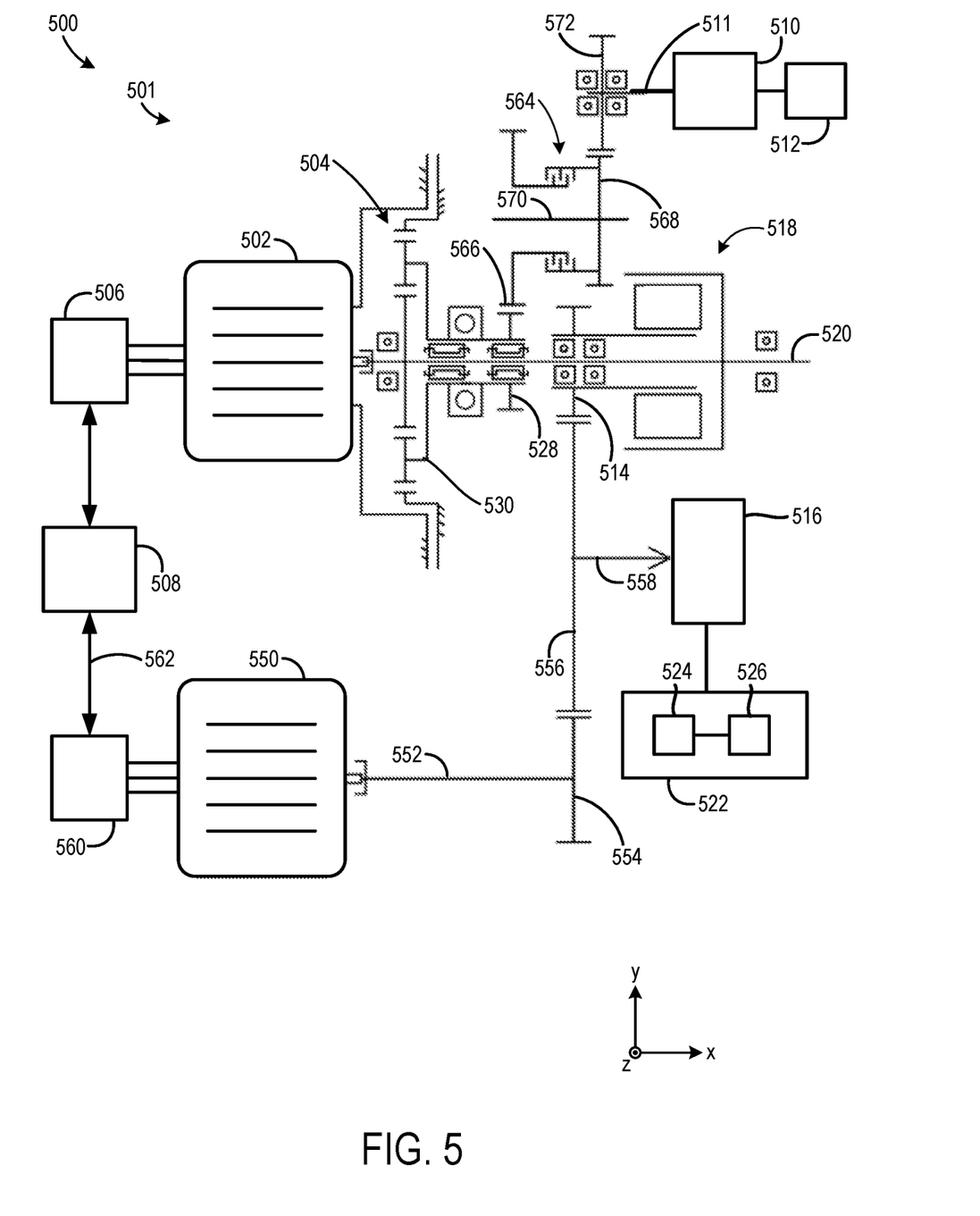
FIG. 5 shows a second example of an electric powertrain with two traction motors and a PTO.

FIG. 5 shows another example of an electric powertrain 500 with a system 501. The electric power 500 includes several components that overlap with the electric powertrain 102 such as a first traction motor 502, a reduction planetary gear set 504, an inverter 506, an electrical energy source 508, a PTO 510, a PTO input shaft 511, one or more implements 512, a gear 514 that is mechanically coupled to a transmission 516, a transmission disconnect clutch 518, an input shaft 520, one or more drive axle assemblies 522 with differential(s) 524 and drive wheels 526, a gear 528 coupled to a carrier 530 of the planetary gear set 504, etc. These overlapping components share similar structure and function to the corresponding component shown in FIGS. 1-3 and described above. As such, redundant description is omitted for brevity.

However, as shown in FIG. 5 the electric powertrain 500 includes a second traction motor 550 which is mechanically coupled to the transmission 516. To elaborate, the system 501 may include another input shaft 552 which may have a gear 554 formed therewith or fixedly coupled thereto that meshes with a gear 556. The gear 556 may mesh with the gear 514. The gear 556 may be coupled to the transmission via one or more suitable mechanical components 558 (e.g., shaft(s), gear(s), chain(s), joint(s), combinations thereof, and the like). An inverter 560 may provide electrical power to the second traction motor 550. Further, the inverter 560 may receive electrical power from the electrical energy source 508 and/or another suitable energy source. Arrows 562 denote the flow of electrical energy between the inverter 560 and the electrical energy source 508. The use of the second motor allows the system's performance and adaptability to be expanded.

The electric powertrain 500 further includes a PTO clutch 564, in the illustrated example. The PTO clutch may be a friction clutch in one example or another suitable clutch in other examples. When the PTO clutch 564 is engaged, mechanical power is transferred from a gear 566 to a gear 568. Conversely, when the PTO clutch is disengaged, power transfer from the gear 566 and the gear 568 is inhibited. In this way, losses in the system are decreased when PTO operation is not desired. The gear 566 meshes with the gear 528, in the illustrated example. Further, the gear 568 may be fixedly coupled to or formed with a shaft 570. Still further, the gear 568 meshes with a gear 572 which is fixedly coupled to or formed with the PTO input shaft 511, in the illustrated example. The system architecture depicted in FIG. 5 allows the system's performance to be increased via the use of the PTO clutch and the second traction motor.

Figure 6:
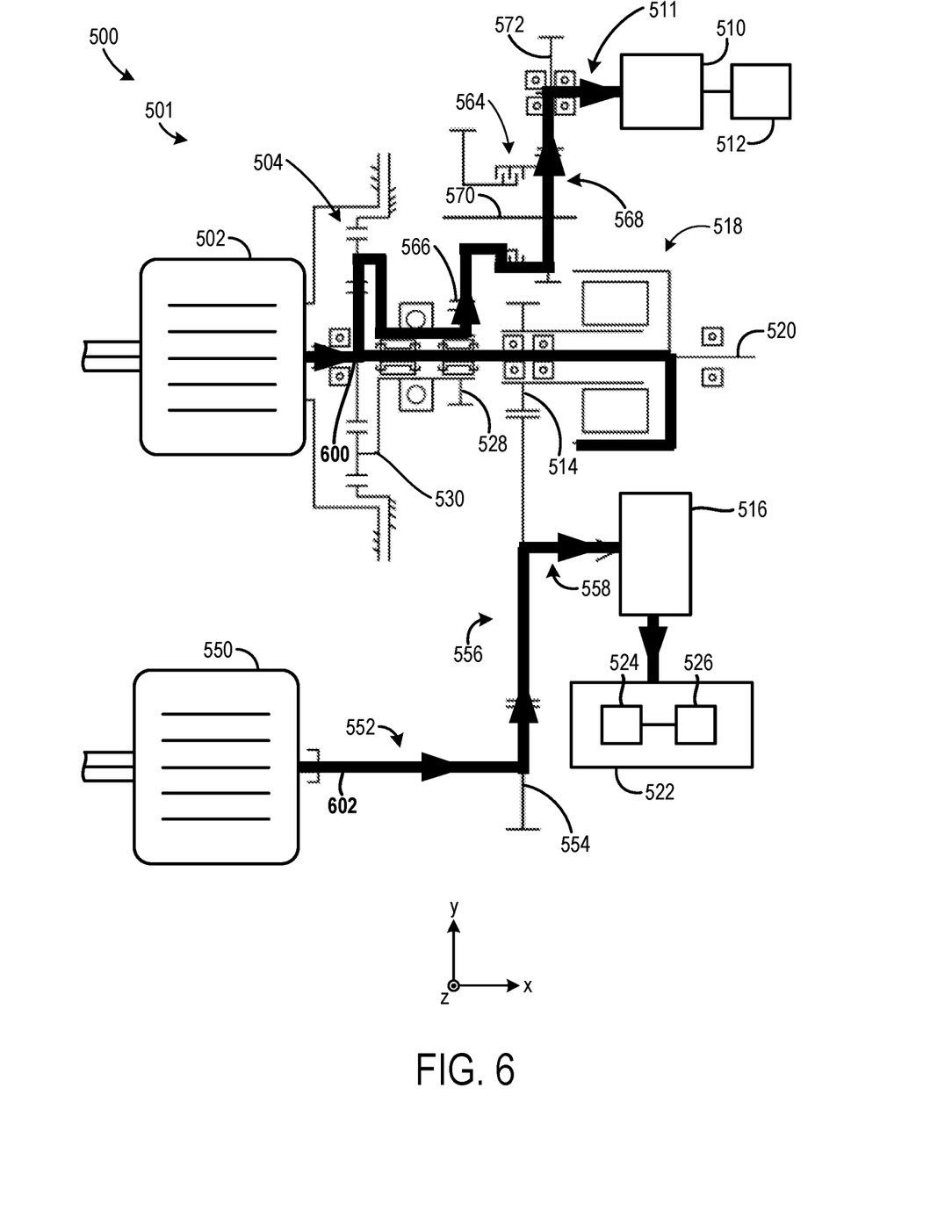
FIGS. 6 and 7 show mechanical power paths through the electric powertrain of FIG. 5.
Figure 7:
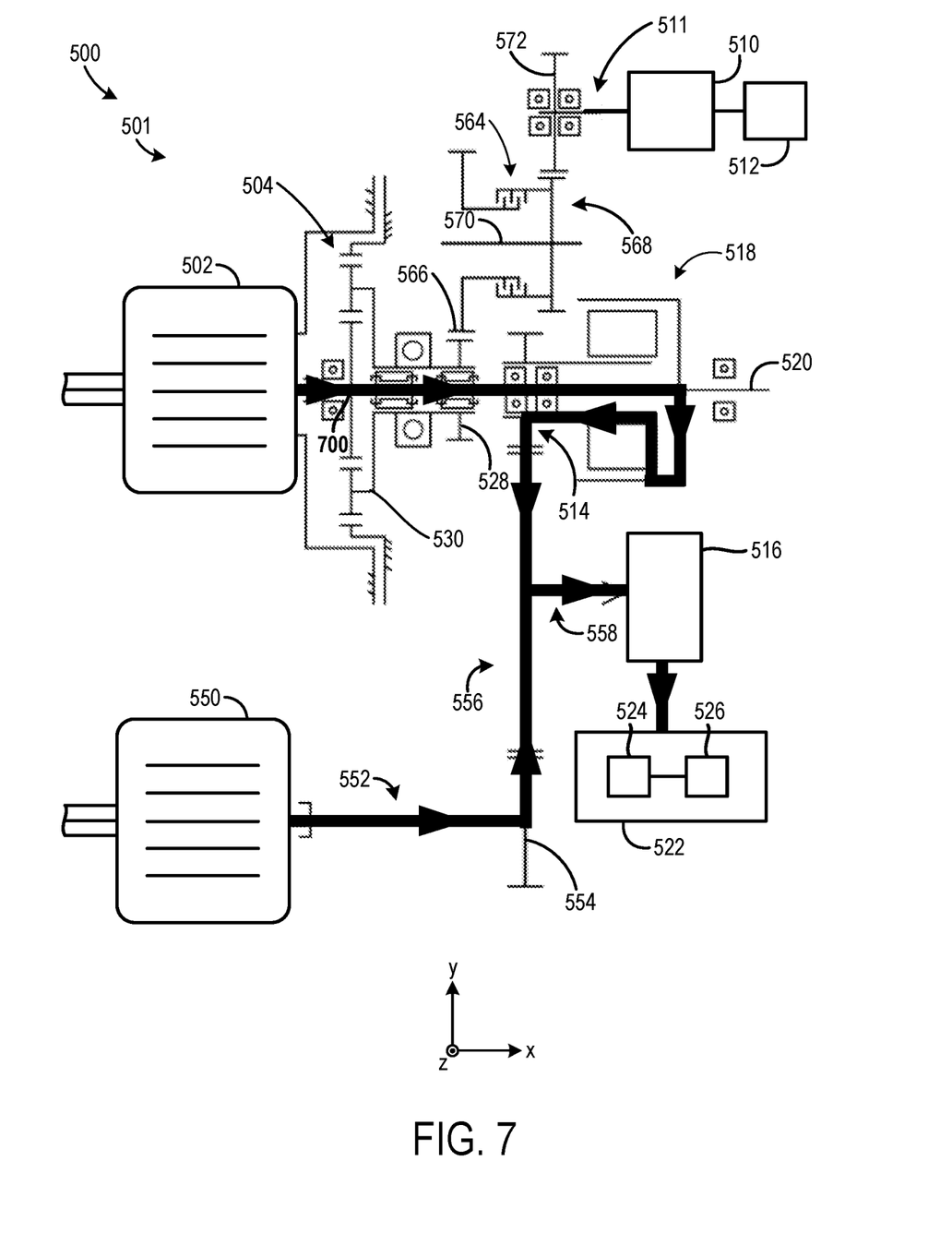

FIGS. 6 and 7 show different mechanical power paths 600, 602, and 700 through the system 501 of the electric powertrain 500 in different modes. The components in the electric powertrain 500 that are shown in FIG. 6 that have been previously described with regard to FIG. 5 are similarly numbered, and redundant description is omitted for brevity.

In FIG. 6 the PTO clutch 564 is engaged and the transmission disconnect clutch 518 is disengaged. The mechanical power path 600 (denoted via bold arrows) unfolds as follows: mechanical power moves from the traction motor 502 to the reduction planetary gear set 504, from the reduction planetary gear set 504 to the PTO clutch 564, and from the PTO clutch to the PTO 510.

The mechanical power path 602 (denoted via bold arrows) unfolds as follows: mechanical power moves from the second traction motor 550 to the input shaft 552, from the input shaft 552 to the gear 554, from the gear 554 to the gear 556, and from the gear 556 to the transmission 516. In this way, the first traction motor 502 solely provides mechanical power to the PTO 510 and the second traction motor 550 provides mechanical power to the transmission 516.

In one example, in the system operating mode depicted in FIG. 6, the second traction motor 550 may be temporarily peaked to reduce the degradation to powertrain performance caused by using the first traction motor to solely drive the PTO and not the transmission. As described herein, peaking the motor involves operating the motor at a power that is higher than a threshold power which indicates a power level above which causes degradation to the motor if the high power level is sustained for a long duration.

In FIG. 7, the PTO clutch 564 is disengaged and the transmission disconnect clutch is engaged. The mechanical power path 700 (denoted via bold arrows) unfolds as follows: in a first branch mechanical power moves from the traction motor 502 to the input shaft 520, from the input shaft to the disconnect clutch 518, from the disconnect clutch 518 to the gear 514, from the gear 514, from the gear 514 to the gear 556, and from the gear 556 to the transmission 516 and in a second branch mechanical power moves from the traction motor 550 to the input shaft 552, from the input shaft 552 to the gear 554, from the gear 554 to the gear 556, and from the gear 556 to the transmission 516. In this way, both traction motors deliver mechanical power to the transmission while the PTO is disconnected.

Figure 8:
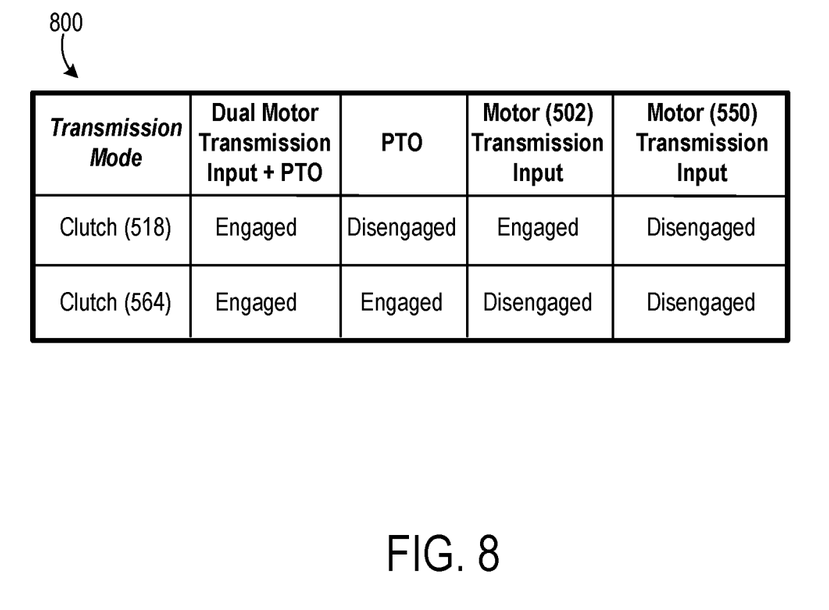
FIG. 8 shows a chart that correlates the different electric powertrain operating modes to clutch positions in the electric powertrain, depicted in FIG. 5.

FIG. 8 shows a chart 800 that correlates the configurations of the disconnect clutch 518 and the PTO clutch 564 in the electric powertrain 500, depicted in FIG. 5. In each of the modes depicted in FIG. 8, the second traction motor is operational and generating rotational output which is transferred to the transmission. However, it will be understood that the system may be operated in modes where the second traction motor is shutdown.

As shown in FIG. 8, in a first mode, both the clutches are engaged such that power is transferred to the PTO from the first motor and from both motors to the transmission. In a second mode (corresponding to the mechanical power path depicted in FIG. 6), the disconnect clutch is disengaged and the PTO clutch is engaged such that power is transferred from the first traction motor to the PTO and from the second traction motor to the transmission. In a third mode (corresponding to the mechanical power path depicted in FIG. 7), the disconnect clutch is engaged and the PTO clutch is disengaged such that both motors provide mechanical power to the transmission while the PTO is disconnected from the first traction motor. In a fourth mode, the disconnect clutch is disengaged and the PTO clutch is disengaged such that the second traction motor is providing mechanical power to the transmission.

Figure 9:
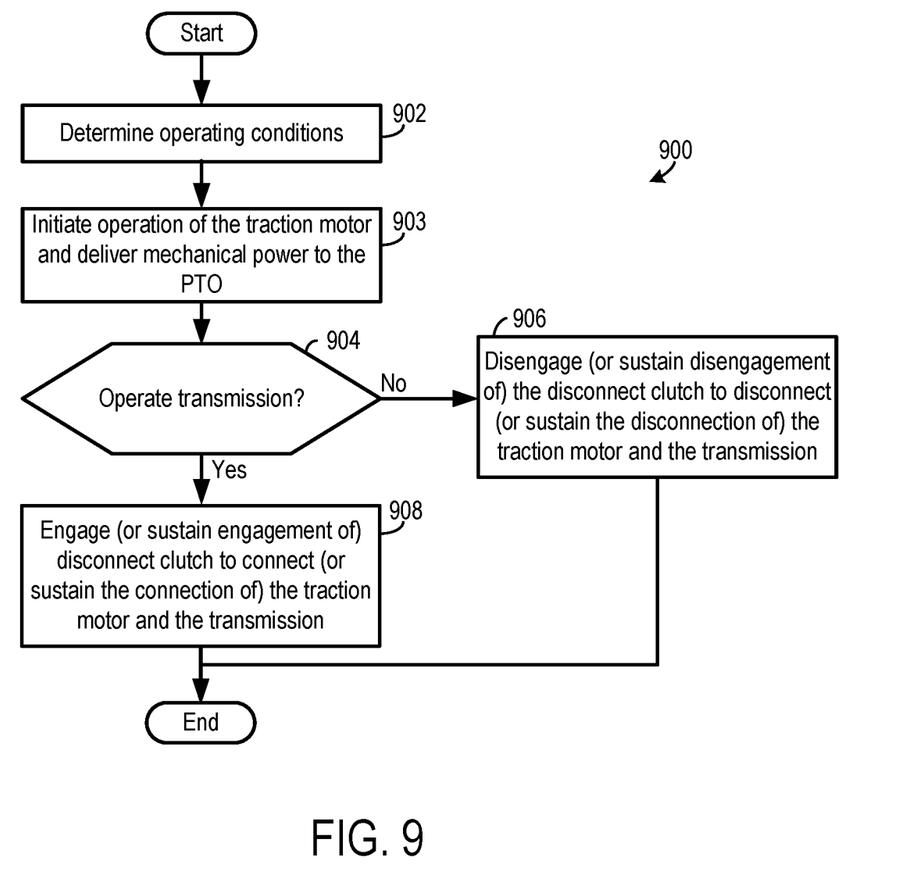
FIG. 9 shows a method for operation of an electric powertrain that includes one traction motor.

FIG. 9 shows a method 900 for operation of an electric powertrain system. The method 900 may be carried out via the electric powertrain 102, discussed above with regard to FIGS. 1-4, in some examples. As such, the electric powertrain may include a single traction motor for providing mechanical power to the transmission. However, in other examples, the method 900 may be implemented by other suitable electric transmission systems. Instructions for carrying out method 900 may be executed by a controller by executing instructions stored in a memory of the controller and in conjunction with signals received from sensors at the controller. The controller may employ actuators in different system components to implement the method steps described below.

At 902, the method includes determining operating conditions in the system and/or vehicle, more generally. The operating conditions may include traction motor speed, transmission input shaft speed, vehicle speed, clutch positon, pedal position, transmission load, PTO power demand, transmission power demand, and the like. These conditions may be determined using sensors and/or modeling algorithms.

At 903, the method includes initiating operation of the traction motor and deliver mechanical power to the PTO. For instance, a command may be sent to an inverter which distributes electrical power to the traction motor such that the traction motor generates a rotational output. In turn, the rotational output drive the reduction planetary gear set and the PTO gear set which is coupled to the PTO's input shaft. In this way, the PTO may be driven in a desired speed range.

At 904, the method includes determining if the transmission should be connected to an input shaft of the traction motor to receive power therefrom. The transmission connection determination may specifically involve determining if a target transmission torque is greater than zero. However, additional or alternative factors may be taken into account when determining whether or not to connect the transmission to the traction motor.

If it is determined that the transmission should not be connected to the traction motor (NO at 904), the method moves to 906. At 906, the method includes disengaging, or sustaining disengagement of, the disconnect clutch to disconnect, or sustain the disconnection of, the traction motor from the transmission. For example, if the transmission was already disconnected from the traction motor (prior to step 906), disengagement of the disconnect clutch is sustained. On the other hand, if the transmission was connected to the traction motor (prior to step 906), the disconnect clutch may be transition to a disengaged state from an engaged state. In this way, the traction motor may be used to drive the PTO while the transmission is disconnected from the traction motor.

If it is determined that the transmission should be connected to the traction motor (YES at 904), the method moves to 908. At 908, the method includes engaging, or sustaining engagement of, the disconnect clutch to connect, or sustain the connection of, the traction motor to the transmission. For example, if the transmission was already connected to the traction motor (prior to step 908), engagement of the disconnect clutch is sustained. Conversely, if the transmission was disconnected from the traction motor (prior to step 908), the disconnect clutch is transitioned to an engaged state from a disengaged state. In this way, the traction motor is used to jointly drive the PTO and the transmission.

Figure 10:
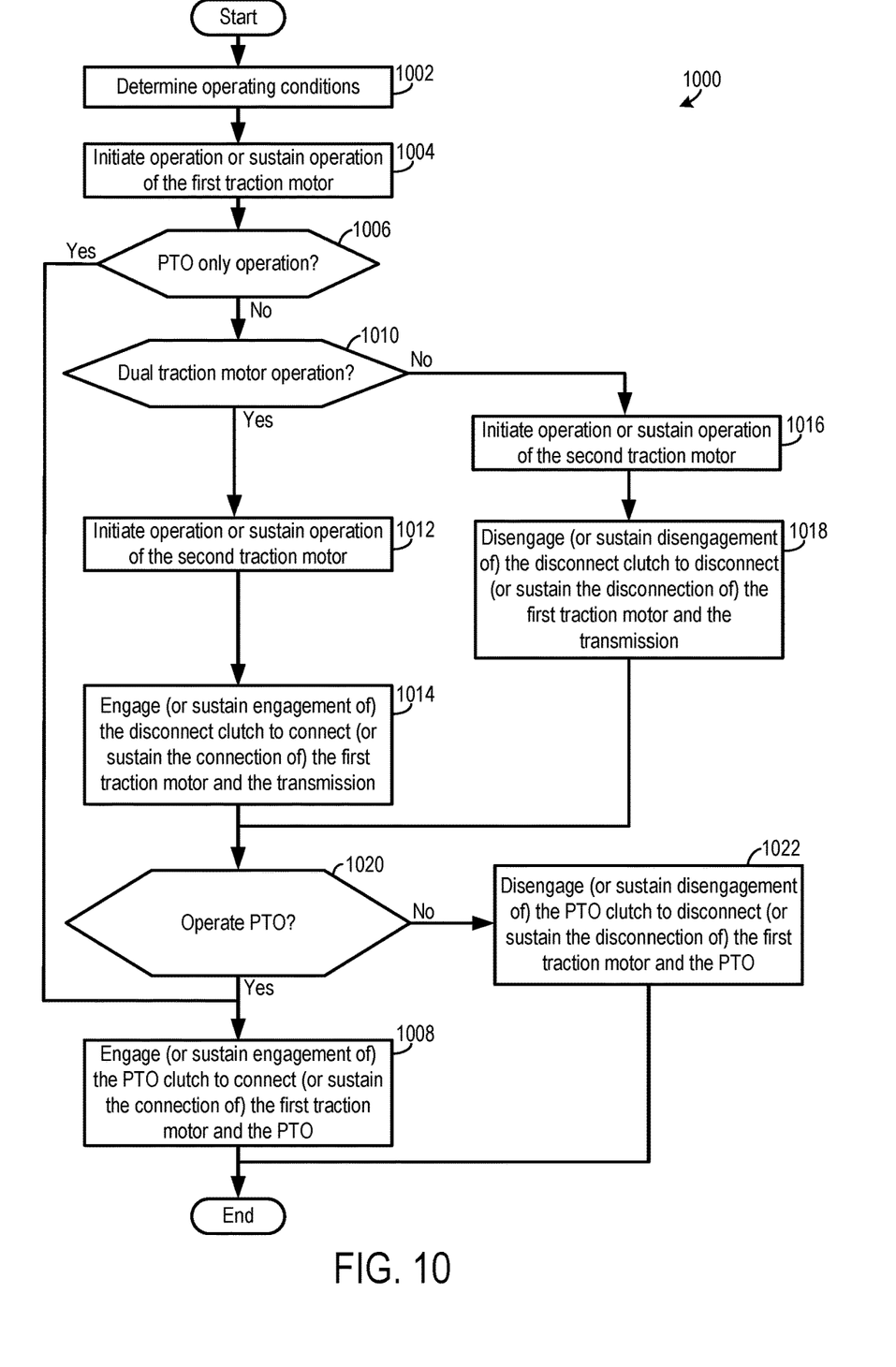
FIG. 10 shows a method for operation of an electric powertrain that includes multiple traction motors.

FIG. 10 shows a method 1000 for operation of an electric powertrain system. The method 1000 may be carried out via the electric powertrain 500 with two traction motors, discussed above with regard to FIGS. 5-8, in some examples. However, in other examples, the method 1000 may be implemented by other suitable electric powertrains. Instructions for carrying out method 1000 may be carried out by a controller that executes instructions which are stored in a memory of the controller and in conjunction with signals received from sensors at the controller. The controller may employ actuators in different system components to implement the method steps described below.

At 1002, the method includes determining operating conditions in the system and the vehicle, more generally. The operating conditions may include speeds of the traction motors, transmission input shaft speed, vehicle speed, clutch positon, pedal position, transmission load, PTO power demand, transmission power demand, and the like. These conditions may be determined using sensors and/or modeling algorithms.

At 1004, the method includes initiating operation or sustaining operation of the first traction motor. For instance, a command may be sent to an inverter which distributes electrical power to the traction motor such that the traction motor generates a rotational output.

At 1006, the method includes determining if the system should be operated where the PTO receives power from the first traction motor but is decoupled from the transmission and the second traction motor is shutdown.

If it is determined that the system should be operated in the PTO only mode (YES at 1006) the method moves to 1008 where the method includes engaging (or sustaining engagement of) the PTO clutch to connect (or sustain the connection of) the first traction motor and the PTO.

Conversely, if it is determined that the system should not be operated in the PTO only mode (NO at 1006) the method moves to 1010. At 1010, the method includes determining if the system should be operated in a dual-motor mode. Such a determination may be ascertained based on transmission power demand, PTO power demand, and the like. For instance, if the transmission power demand is greater than a threshold value and/or the PTO power demand is greater than a threshold value it may be determined that the system should be operated in the dual-motor mode.

If it is determined that the system should be operated in the dual-motor mode (YES at 1010) the method moves to 1012. At 1002, the method includes initiating operation or sustaining operation of the second traction motor. For instance, a command may be sent to an inverter which distributes electrical power to the second traction motor such that the second traction motor generates a rotational output. Next at 1014, the method includes engaging (or sustaining engagement of) the disconnect clutch to connect (or sustain the connection of) the first traction motor and the transmission.

On the other hand, if it is determined that the system should not be operated in the dual-motor mode (NO at 1010) the method moves to 1016. At 1016, the method includes initiating operation or sustaining operation of the second traction motor. For instance, a command may be sent to an inverter which distributes electrical power to the second traction motor such that the second traction motor generates a rotational output. Next at 1018, the method includes disengaging (or sustaining disengagement of) the disconnect clutch to disconnect (or sustain the disconnection of) first traction motor and the transmission.

At 1020, the method includes determining if the PTO should be operated. This determination may take into account the PTO power demand and operator input via an input device which indicates an operator's desire to utilize the PTO. For instance, an operator may trigger the input device to initiate PTO operation. In other examples, the PTO operation determination may be automatically implemented when an implement is attached to the PTO, for instance.

If it is determined that the PTO should be operated (YES at 1020) the method moves to 1008. Conversely, if it is determined that the PTO should not be operated (NO at 1020) the method moves to 1022 where the method includes disengaging (or sustaining disengagement of) PTO clutch to disconnect (or sustain the disconnection of) the first traction motor and the PTO. Method 1000 allows a variety of powertrain operating modes to be implemented in the electric transmission system to expand the system's capabilities.

The technical effect of the electric powertrain system and operating methods described herein is to expand the system's PTO capabilities and specifically allow concurrent PTO operation and transmission operation, without constraining the capabilities of the transmission or PTO, if desired.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such.

The invention will be further described in the following paragraphs. In one aspect, a powertrain system is provided that includes a first traction motor; a reduction planetary gear set rotationally coupled to the first traction motor and a power take-off (PTO) that is configured to attach to an implement; and an input shaft rotationally coupled to the first traction motor and a transmission; wherein the reduction planetary gear set has a grounded component.

In another aspect, a method for operation of a powertrain system that includes selectively disconnecting a power take-off (PTO) from a first traction motor through operation of a PTO clutch; wherein the powertrain system includes the PTO clutch, the first traction motor, a reduction planetary gear set rotationally coupled to the first traction motor and a PTO that is configured to attach to an implement, and an input shaft rotationally coupled to the first traction motor and coupled to a transmission. The method may further include, in one example, selectively disconnecting the first traction motor from the transmission via operation of a transmission disconnect clutch while a second traction motor that is rotationally coupled to the transmission is operational.

In yet another aspect, an electric vehicle (EV) powertrain system is provided that includes a first traction motor; an input shaft rotationally coupled to the first traction motor and a transmission; and a reduction planetary gear set including a sun gear rotationally coupled to the input shaft and a carrier rotationally coupled to a power take-off (PTO) clutch; wherein the PTO clutch is configured to selectively disconnect the reduction planetary gear set from a PTO which is configured to attach to an implement; wherein the reduction planetary gear set has a grounded component.

In any of the aspects or combinations of the aspects, the powertrain system may further include a PTO clutch configured to selectively disconnect the PTO from the reduction planetary gear set.

In any of the aspects or combinations of the aspects, the powertrain system may further include a controller including instructions that when executed, during operation of the first traction motor, cause the controller to selectively disengage the PTO clutch based on operating conditions.

In any of the aspects of combinations of the aspects, the PTO clutch may be a friction clutch.

In any of the aspects or combinations of the aspects, the implement may be a hydraulic pump.

In any of the aspects or combinations of the aspects, the reduction planetary gear set may be a simple reduction planetary gear set.

In any of the aspects or combinations of the aspects, the reduction planetary gear set may include a sun gear that is fixedly coupled to the input shaft; a carrier rotationally coupled to the PTO; and a ring gear that is grounded.

In any of the aspects or combinations of the aspects, the ring gear may be grounded by a transmission housing.

In any of the aspects or combinations of the aspects, the powertrain system may further include a second traction motor rotationally coupled to the transmission.

In any of the aspects or combinations of the aspects, the powertrain system may further include a transmission disconnect clutch configured to selectively disconnect the first traction motor from the transmission.

In any of the aspects or combinations of the aspects, the transmission may be a multi-speed transmission.

In any of the aspects or combinations of the aspects, the PTO clutch may be a wet friction clutch.

In any of the aspects or combination of the aspects, the reduction planetary gear set may include a ring gear that is grounded by a transmission housing.

In any of the aspects or combinations of the aspects, the powertrain system may further include a second traction motor rotationally coupled to the transmission; a transmission disconnect clutch configured to selectively disconnect the first traction motor from the transmission and a controller including instructions that when executed, during operation of the first and second traction motors, cause the controller to disengage the transmission disconnect clutch and engage the PTO clutch.

In any of the aspects or combinations of the aspects, the transmission disconnect clutch may be a wet friction clutch.

In any of the aspects or combinations of the aspects, the implement may be a hydraulic pump.

In any of the aspects or combinations of the aspects, the EV powertrain system may be an all-electric powertrain system.

In another representation, a dual motor electric drive is provided that comprises a first traction motor, a power take-off (PTO) that is selectively rotationally coupled to the first traction motor via a PTO clutch, a transmission that is selectively rotationally coupled to the first traction motor via a disconnect clutch, and a second traction motor that is rotationally coupled to the transmission.

Note that the example control and estimation routines included herein can be used with various powertrain, electric drive, and/or powertrain system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the vehicle and/or powertrain control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of traction motors, internal combustion engines, and/or transmissions. The subject matter of the present disclosure includes all novel and non-obvious combinations and sub-combinations of the various systems and configurations, and other features, functions, and/or properties disclosed herein.

As used herein, the term "substantially" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A powertrain system, comprising:
a first traction motor;
a reduction planetary gear set including:
 a sun gear rotationally coupled to the first traction motor; and
 a carrier rotationally coupled to a power take-off (PTO) via one or more components that are external to the reduction planetary gear set, wherein the PTO is configured to attach to an implement;
an input shaft rotationally coupled to:
 the first traction motor; and
 a transmission via a gear;
a second traction motor rotationally coupled to the transmission; and
a transmission disconnect clutch configured to selectively disconnect the first traction motor from the transmission;
wherein the reduction planetary gear set includes a ring gear that is permanently grounded; and
wherein the transmission is rotationally coupled to one or more drive axles.

2. The powertrain system of claim 1, further comprising a PTO clutch configured to selectively disconnect the PTO from the reduction planetary gear set.

3. The powertrain system of claim 2, further comprising:
a controller including instructions that when executed, during operation of the first traction motor, cause the controller to:
 selectively disengage the PTO clutch based on operating conditions.

4. The powertrain system of claim 2, wherein the PTO clutch is a friction clutch.

5. The powertrain system of claim 1, wherein the implement is a hydraulic pump.

6. The powertrain system of claim 1, wherein the reduction planetary gear set is a simple reduction planetary gear set.

7. The powertrain system of claim 6, wherein the carrier is rotationally coupled to the PTO via one or more gears and shafts.

8. The powertrain system of claim 7, wherein the ring gear is grounded by a transmission housing.

9. The powertrain system of claim 1, wherein the transmission is a multi-speed transmission with multiple discrete gears.

10. A method for operation of a powertrain system, comprising:
selectively disconnecting a power take-off (PTO) from a first traction motor through operation of a PTO clutch; and
selectively disconnecting the first traction motor from the transmission via operation of a transmission disconnect clutch while a second traction motor that is rotationally coupled to the transmission is operational;
wherein the powertrain system includes:
the PTO clutch;
the first traction motor;
the second traction motor;
the transmission disconnect clutch;
a reduction planetary gear set rotationally coupled to the first traction motor and including:
a carrier rotationally coupled to the PTO via one or more components that are external to the reduction planetary gear set, wherein the PTO is configured to attach to an implement; and
a ring gear that is permanently grounded;
wherein the PTO is configured to attach to an implement; and
an input shaft rotationally coupled to the first traction motor and coupled to a transmission via a gear.

11. An all-electric vehicle (EV) powertrain system, comprising:
a first traction motor;
an input shaft rotationally coupled to the first traction motor and a transmission; and
a reduction planetary gear set including:
a sun gear rotationally coupled to the input shaft;
a carrier rotationally coupled to a power take-off (PTO) clutch via one or more components, wherein the PTO is configured to attach to an implement; and
a ring gear that is permanently grounded;
a second traction motor rotationally coupled to the transmission;
a transmission disconnect clutch configured to selectively disconnect the first traction motor from the transmission; and
a controller including instructions that when executed, during operation of the first traction motor and the second traction motor, cause the controller to:
disengage the transmission disconnect clutch; and
engage the PTO clutch;
wherein the PTO clutch is configured to selectively disconnect the reduction planetary gear set from the PTO which is configured to attach to an implement.

12. The all-electric EV powertrain system of claim 11, wherein the PTO clutch is a wet friction clutch.

13. The all-electric EV powertrain system of claim 11, wherein the ring gear is grounded by a transmission housing.

14. The all-electric EV powertrain system of claim 11, wherein the transmission disconnect clutch is a wet friction clutch.

15. The all-electric EV powertrain system of claim 11, wherein the implement is a hydraulic pump.

* * * * *